US012679310B2

(12) United States Patent (10) Patent No.: US 12,679,310 B2

Felch et al. (45) Date of Patent: Jul. 14, 2026

(54) BRAKE ARCHITECTURE FOR COMBINED HYDRAULIC AND ELECTROMECHANICAL BRAKING SYSTEM

(71) Applicant: Ford Global Technologies, LLC, Dearborn, MI (US)

(72) Inventors: Harold John Felch, Novi, MI (US); Thomas Svensson, Leichlingen (DE); Daniel A. Gabor, Canton, MI (US); Mostafa Shuva, Sterling Heights, MI (US); Joachim Heimann, Cologne (DE); Andrew Stoscup, Wixom, MI (US); Roberto Villegas Muriel, Atizapan de Zaragoza (MX); Chad Michael Korte, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 18/489,124

(22) Filed: Oct. 18, 2023

(65) Prior Publication Data

US 2025/0128681 A1 Apr. 24, 2025

(51) Int. Cl.
B60T 7/04 (2006.01)
B60T 13/66 (2006.01)
(Continued)

(52) U.S. Cl.
CPC ............ B60T 7/042 (2013.01); B60T 13/662 (2013.01); B60T 13/741 (2013.01); (Continued)

(58) Field of Classification Search
CPC ........ B60T 7/042; B60T 8/267; B60T 13/662; B60T 13/741; B60T 13/745; (Continued)

(56) References Cited

U.S. PATENT DOCUMENTS 7,837,278 B2 11/2010 Nilsson
8,639,428 B2 1/2014 Holzwarth
(Continued)

FOREIGN PATENT DOCUMENTS

CN 113147703 A * 7/2021
CN 110603178 B 11/2022
(Continued)

*Primary Examiner* — John M Zaleskas
(74) *Attorney, Agent, or Firm* — Burr & Forman; Lorne Forsythe

(57) ABSTRACT

A braking system includes a first hydraulic brake assembly associated with a first front wheel, a second hydraulic brake assembly associated with a second front wheel, a front EBB module operably coupled to the first and second hydraulic brake assemblies for primary operation of the first and second hydraulic brake assemblies, a first EMB assembly associated with a first rear wheel, a second EMB assembly associated with a second rear wheel, a controller operably coupled to the first and second EMB assemblies for primary operation of the first and second EMB assemblies, a first power network and a second power network providing redundant power supply to the system, and a bus network operably coupling both the EBB module and the controller to the first and second EMB assemblies so the EBB module can provide control of backup operation of the first and second EMB assemblies if the controller is inoperable.

16 Claims, 4 Drawing Sheets

(51) Int. Cl.
  B60T 13/74 (2006.01)
  B60T 17/22 (2006.01)
(52) U.S. Cl.
  CPC ............ B60T 13/745 (2013.01); B60T 17/22 (2013.01); *B60T 2270/404* (2013.01)
(58) Field of Classification Search
  CPC ......... B60T 2270/402; B60T 2270/404; B60T 2270/416
  See application file for complete search history.

(56) References Cited

U.S. PATENT DOCUMENTS

| | | | |
|---|---|---|---|
| 9,744,950 B1* | 8/2017 | Lemmer | B60T 13/588 |
| 10,569,657 B2 | 2/2020 | Yamamoto et al. | |
| 2004/0135432 A1* | 7/2004 | Reuter | B60T 8/4081 |
| | | | 303/152 |
| 2005/0017574 A1 | 1/2005 | Weiberle et al. | |
| 2006/0273658 A1* | 12/2006 | Halassy-Wimmer | |
| | | | B60T 13/746 |
| | | | 303/191 |
| 2007/0278856 A1* | 12/2007 | Craig | B60T 13/588 |
| | | | 303/3 |
| 2008/0296106 A1* | 12/2008 | Nilsson | B60T 8/345 |
| | | | 701/115 |
| 2009/0302673 A1* | 12/2009 | Linhoff | B60W 10/08 |
| | | | 303/3 |
| 2010/0030444 A1* | 2/2010 | Roll | B60T 8/267 |
| | | | 701/80 |
| 2010/0113215 A1* | 5/2010 | Jager | B60T 8/17616 |
| | | | 477/29 |
| 2010/0241330 A1* | 9/2010 | Hartmann | B60T 8/344 |
| | | | 701/70 |
| 2011/0160970 A1* | 6/2011 | Crombez | B60T 8/321 |
| | | | 303/3 |
| 2011/0168502 A1* | 7/2011 | Linhoff | B60T 13/588 |
| | | | 303/3 |
| 2011/0254357 A1 | 10/2011 | Vollert et al. | |
| 2015/0115697 A1* | 4/2015 | Yamamoto | B60T 13/745 |
| | | | 303/3 |
| 2015/0203082 A1* | 7/2015 | Forster | B60T 13/74 |
| | | | 701/70 |
| 2017/0072920 A1* | 3/2017 | Besier | B60T 8/4081 |

| | | | |
|---|---|---|---|
| 2017/0232849 A1* | 8/2017 | Yamamoto | B60T 8/267 |
| | | | 303/15 |
| 2018/0043867 A1* | 2/2018 | Lemmer | B60T 13/662 |
| 2018/0154875 A1* | 6/2018 | Takahashi | B60L 7/18 |
| 2018/0215363 A1* | 8/2018 | Kita | B60T 7/042 |
| 2018/0326965 A1* | 11/2018 | Yamamoto | B60T 13/142 |
| 2019/0031162 A1* | 1/2019 | Besier | B60T 8/176 |
| 2019/0039579 A1* | 2/2019 | Ohkubo | B60L 7/26 |
| 2019/0145475 A1* | 5/2019 | Yamauchi | F16D 65/18 |
| | | | 188/72.8 |
| 2019/0152451 A1* | 5/2019 | Nakaoka | B60T 13/662 |
| 2019/0161036 A1* | 5/2019 | Shimono | B60T 8/17 |
| 2020/0108809 A1* | 4/2020 | Mizutani | B60T 17/221 |
| 2020/0114888 A1* | 4/2020 | Michels | B60T 8/4077 |
| 2020/0384966 A1* | 12/2020 | Ito | B60T 8/172 |
| 2021/0323523 A1 | 10/2021 | Adler et al. | |
| 2021/0394729 A1* | 12/2021 | Seol | B60T 8/17616 |
| 2022/0169222 A1* | 6/2022 | Ullrich | B60Q 9/00 |
| 2022/0194339 A1* | 6/2022 | Tarandek | B60T 13/145 |
| 2022/0194344 A1* | 6/2022 | Tarandek | B60T 8/17 |
| 2022/0314950 A1 | 10/2022 | Nilsson et al. | |
| 2023/0009033 A1* | 1/2023 | Monnier | B60T 13/36 |
| 2023/0070909 A1* | 3/2023 | Takimoto | F16D 65/183 |
| 2023/0415717 A1* | 12/2023 | Kim | B60T 13/662 |
| 2024/0034285 A1* | 2/2024 | Cochran | B60T 13/683 |
| 2024/0075817 A1* | 3/2024 | Wang | B60T 13/686 |
| 2024/0140380 A1* | 5/2024 | Kim | B60L 7/26 |
| 2024/0286595 A1* | 8/2024 | Ullrich | B60T 8/885 |
| 2025/0128689 A1* | 4/2025 | Felch | B60T 17/221 |

FOREIGN PATENT DOCUMENTS

| | | | | |
|---|---|---|---|---|
| DE | 10319194 B3 | 9/2004 | | |
| DE | 10319663 A1 | 11/2004 | | |
| DE | 102005037382 A1 | 2/2007 | | |
| DE | 102006055765 A1 | 1/2008 | | |
| DE | 102012020421 A1 * | 4/2014 | ........... | B60T 13/146 |
| DE | 102012219533 A1 * | 4/2014 | ........... | B60T 13/741 |
| DE | 102013224776 A1 * | 6/2015 | ........... | B60T 13/146 |
| EP | 2342110 B1 | 11/2012 | | |
| EP | 4163166 A1 | 4/2023 | | |
| KR | 100208594 A * | 7/1999 | | |
| KR | 20100094146 A | 8/2010 | | |
| KR | 101512869 B1 | 4/2015 | | |
| WO | 0066410 A1 | 11/2000 | | |
| WO | WO-2007014952 A1 * | 2/2007 | ........... | B60T 13/686 |

* cited by examiner

BRAKE ARCHITECTURE FOR COMBINED HYDRAULIC AND ELECTROMECHANICAL BRAKING SYSTEM

TECHNICAL FIELD

Example embodiments generally relate to vehicle braking systems and, more particularly, relate to a system that provides redundant power for brake assemblies of different types.

BACKGROUND

Brake boost systems are commonly used in automotive settings in order to increase the actuation force from a driver's foot on a brake pedal to acceptable levels in order to properly engage a vehicle's brakes when hydraulic brakes are employed. Meanwhile, electromechanical brakes (EMB) are also becoming popular, most often as an alternative to hydraulic brakes. To the extent a combination of hydraulic brakes and EMB were employed on the same vehicle, an issue may arise with respect to complicating the provision of redundant power supplies and signaling for activation of each of the different brake system types.

Thus, it may be desirable to develop an architecture that provides redundant power supply and signaling capabilities with respect to dissimilar types of brake systems.

BRIEF SUMMARY OF SOME EXAMPLES

In accordance with an example embodiment, a vehicle braking system may be provided. The system may include a first hydraulic brake assembly associated with a first front wheel, a second hydraulic brake assembly associated with a second front wheel, a front electronic brake boost (EBB) module operably coupled to the first and second hydraulic brake assemblies to control primary operation of the first and second hydraulic brake assemblies, a first electro mechanical brake (EMB) assembly associated with a first rear wheel, a second EMB assembly associated with a second rear wheel, a controller operably coupled to the first and second EMB assemblies to control primary operation of the first and second EMB assemblies, a first power network and a second power network providing redundant power supply to the system, and a communication bus network operably coupling both the EBB module and the controller to the first and second EMB assemblies to enable the EBB module to provide control of backup operation of the first and second EMB assemblies if the controller is inoperable.

In another example embodiment, a communication bus network for a vehicle braking system may be provided. The vehicle braking system includes a first hydraulic brake assembly associated with a first front wheel, a second hydraulic brake assembly associated with a second front wheel, a front EBB module operably coupled to the first and second hydraulic brake assemblies to control primary operation of the first and second hydraulic brake assemblies, a first EMB assembly associated with a first rear wheel, a second EMB assembly associated with a second rear wheel, a controller operably coupled to the first and second EMB assemblies to control primary operation of the first and second EMB assemblies, and a first power network and a second power network providing redundant power supply to the system. The communication bus network may include a first communication bus operably coupling the first and second EMB assemblies to the EBB module, and a second bus network operably coupling the first and second EMB assemblies to the controller. The communication bus network operably couples both the EBB module and the controller to the first and second EMB assemblies to enable the EBB module to provide control of backup operation of the first and second EMB assemblies if the controller is inoperable.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
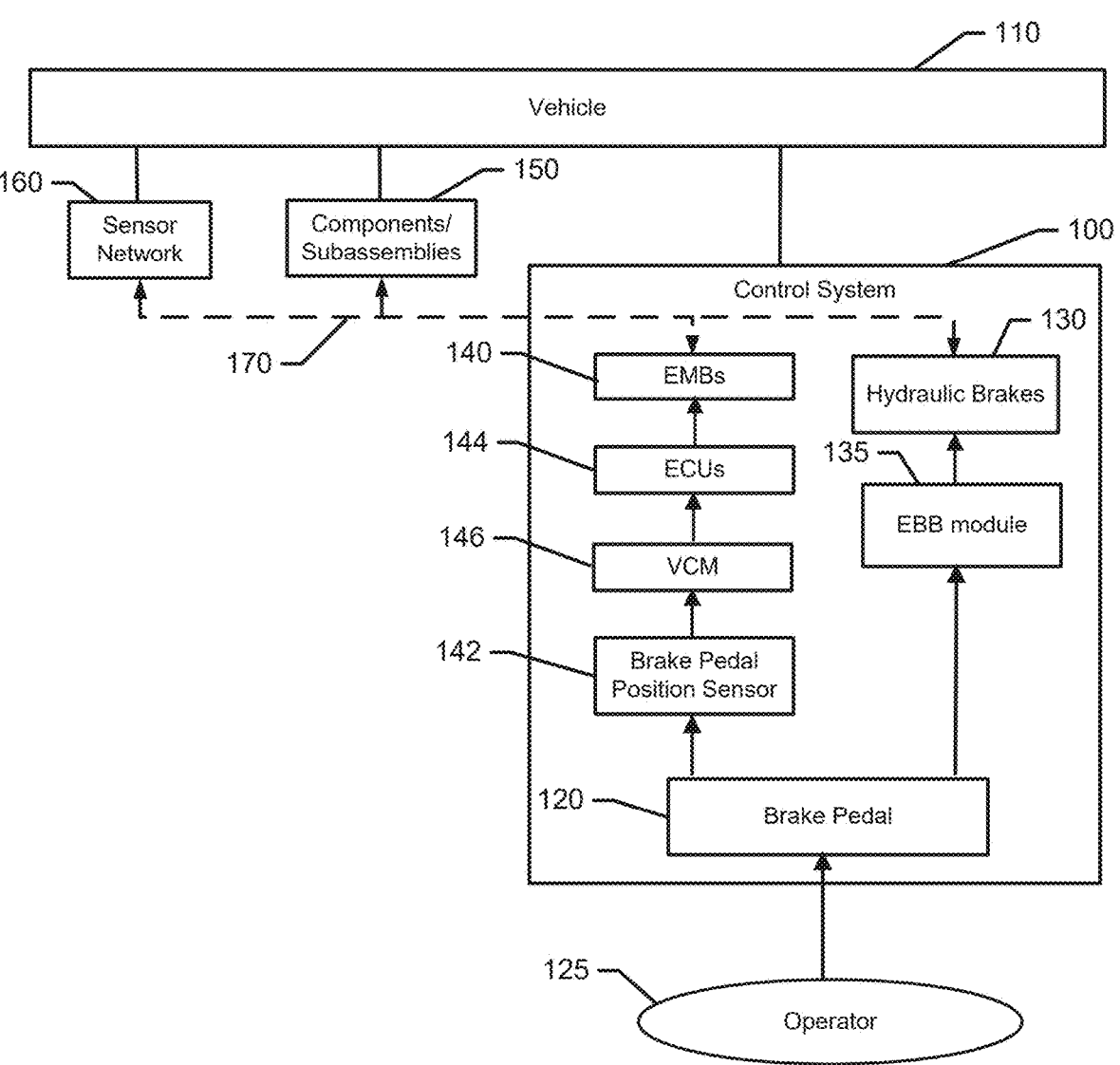
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Normally, the redundancy for a pure hydraulic brake system is provided through mechanical hydraulic push through of a brake pedal on a hydraulic cylinder supplying braking pressure to all four wheel ends. In some situations and vehicle architectures, the rear brake circuits are isolated from the front during mechanical hydraulic push through with the rear electric park brakes employed to deliver additional braking torque. Front electronic brake boost (EBB) hydraulic, rear axle electromechanical brake (EMB) architectures in passenger vehicles require a redundant power supply and a supporting control structure. However, as noted above, doing so in a context in which different brake systems are employed may be difficult to achieve, and signaling in backup modes of operation may be difficult to achieve as well. Example embodiments aim to provide separate electronic control units (ECUs) for each of the rear EMBs that are each is powered from a different power source, but where signaling can be provided in backup modes (i.e., when the central controller for the ECUs is unavailable) via the EBB module using a network bus architecture that provides backup signaling when needed.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 that is generally foot operated by an operator 125 to initiate braking forces, or braking torque application at the wheels of the vehicle 110. The brake pedal 120 may be operably coupled to hydraulic brakes 130 (e.g., front brakes) via mechanical and/or hydraulic connections under control of an EBB module 135. The brake pedal 120 may also be operably coupled to EMBs 140 (e.g., rear brakes) via a brake pedal position sensor 142, and the EMBs 140 may be actuated responsive to operation of respective instances of ECUs 144 that receive instruction from a vehicle control module (VCM) 146 operably coupled to the brake pedal position sensor 142 to receive position information indicative of the brake pedal 120. The brake pedal position sensor 142 may provide data indicative of the precise position of the brake pedal 120 as an input to the VCM 146.

Notably, the control pedals could alternatively be hand operated or any other operable member via which the operator 125 may provide an input indicative of an intent of the operator relative to controlling net torque for application to the wheels of the vehicle 110. In some cases, the control system 100 may be configured to perform other tasks related or not related to propulsive and braking control or performance management.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via one or more instances of a vehicle communication bus (e.g., a controller area network (CAN) bus) 170.

The components or subassemblies 150 may include, for example, a braking system, a propulsion system and/or a wheel assembly of the vehicle 110. The braking system may be configured to provide braking inputs to braking components of the vehicle 110, and includes the components discussed above. One or more corresponding sensors of the sensor network 160 that may be operably coupled to the brake system and/or the wheel assembly may provide information relating to brake torque, brake torque rate, vehicle velocity (including rate of change of velocity), front/rear wheel speeds, vehicle pitch, etc. Inputs from the sensors of the sensor network 160 may be provided to the control system 100 to enable the control system 100 to provide various primary and secondary (or backup) control functions related to the components or subassemblies 150. Accordingly, for example, the control system 100 may be able to receive numerous different parameters, indications and other information that may be related to or indicative of different situations or conditions associated with vehicle status. The control system 100 may also receive information indicative of the intent of the operator 125 relative to control of various aspects of operation of the vehicle 110 and then be configured to use the information received to provide instructions to control responses to the situations or conditions determined. The control system 100 of FIG. 1 may be similar to conventional systems in many respects, except that, the control system 100 may be modified to respond to situations in which backup power and signaling is required for the EMBs 140 as described in greater detail in reference to FIGS. 2-4.

Figure 2:
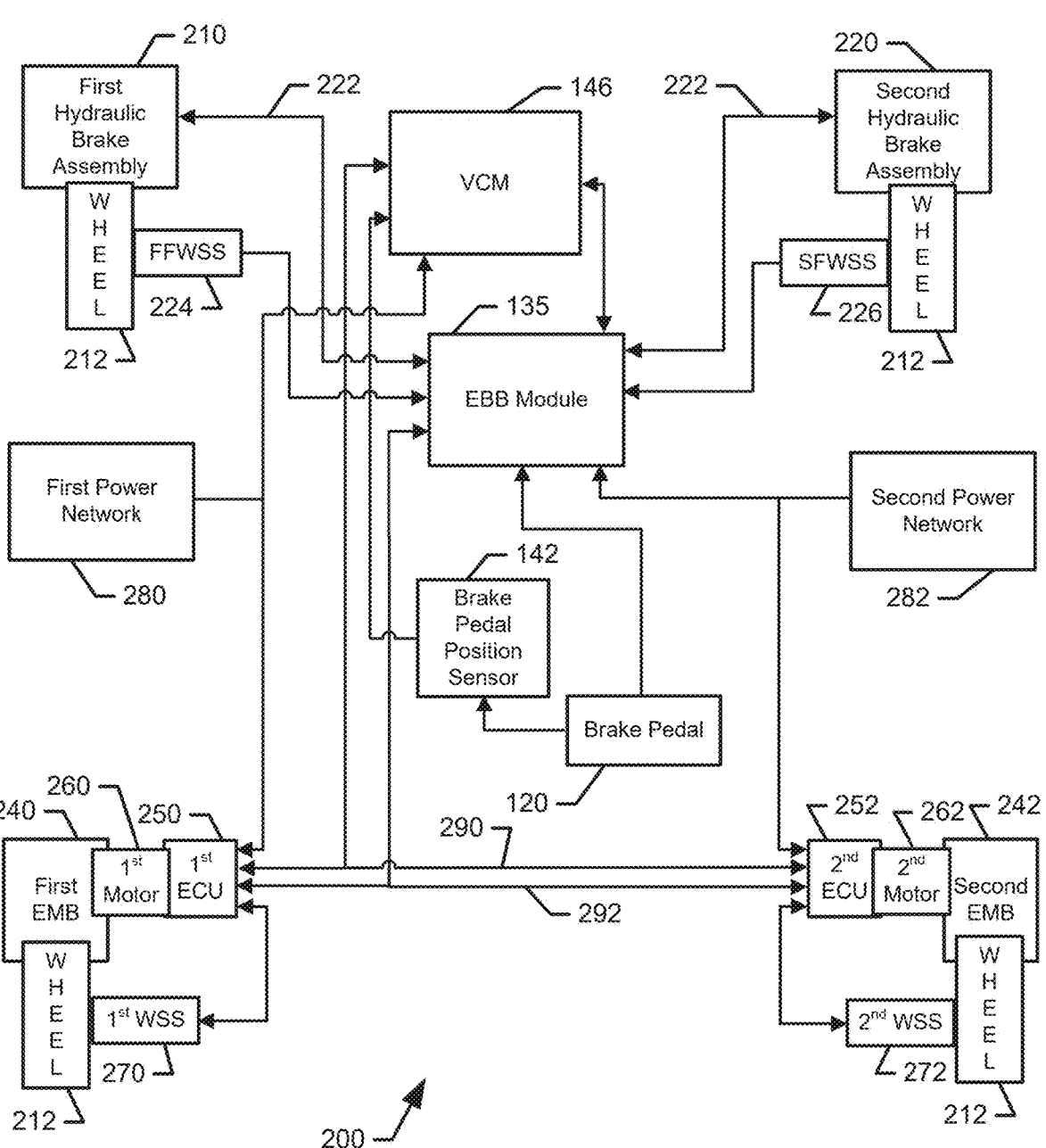
FIG. 2 illustrates a block diagram of some components of the vehicle control system of FIG. 1 in accordance with an example embodiment.

FIG. 2 illustrates a block diagram of various components of a control system 200, which may be considered either a specific example of the control system 100 of FIG. 1, or a portion thereof that is associated with a vehicle braking system. In this regard, for example, FIG. 2 illustrates example interactions under normal operating circumstances for the control system 200 between the brake pedal 120, the EBB module 135, and the VCM 146 of FIG. 1, and various other elements of the components or subassemblies 150 relative to information received thereby (e.g., from the sensor network 160, from various ones of the components/subassemblies 150, and/or from the operator 125).

The control system 200 may include the brake pedal 120, which may have the corresponding brake pedal position sensor 142 for determining a position of the brake pedal 120 and providing a signal or input to the VCM 146 that is indicative of the position determined. The hydraulic brakes 130 of FIG. 1 may include a first hydraulic brake assembly 210 associated with one of the wheels 212 (e.g., a left front wheel) of the vehicle 110, and a second hydraulic brake assembly 220 associated with another one of the wheels 212 (e.g., a right front wheel) of the vehicle 110. Each of the first and second hydraulic brake assemblies 210 and 220 may include respective instances or a brake caliper or drum for providing frictional braking of the corresponding wheels 212 associated therewith. Hydraulic power for actuating the first and second hydraulic brake assemblies 210 and 220 may be provided from the EBB module 135 via respective instances of hydraulic lines 222. Each of the wheels 212 associated with the first and second hydraulic brake assemblies 210 and 220 may also have a corresponding wheel speed sensor associated therewith (e.g., first front wheel speed sensor (FFWSS) 224 and second front wheel speed sensor (SFWSS) 226) to measure the wheel speed of the corresponding ones of the wheels 212 and provide information on wheel speed measured to the EBB module 135.

The control system 200 may also include a first EMB 240 associated with a respective one of the wheels 212 (e.g., a left rear wheel) and a second EMB 242 associated with another respective one of the wheels 212 (e.g., a right rear wheel). The first and second EMBs 240 and 242 are examples of the EMBs 140 of FIG. 1, and the ECUs 144 of FIG. 1 may be exemplified by first ECU 250 and second ECU 252 of FIG. 2. The first ECU 250 may be operably coupled to a first motor 260, which may actuate a brake caliper or drum (based on brake pedal 120 application) under control of the first ECU 250 to provide braking torque to the wheel 212 (e.g., the left rear wheel). The second ECU 252 may be operably coupled to a second motor 262, which may actuate a brake caliper or drum (based on brake pedal 120 application) under control of the second ECU 252 to provide braking torque to the wheel 212 (e.g., the right rear wheel).

Wheel speed for the wheel 212 corresponding to the first EMB 240 (e.g., the left rear wheel) may be measured by a first wheel speed sensor (WSS) 270, and wheel speed for the wheel 212 corresponding to the second EMB 242 (e.g., the right rear wheel) may be measured by a second WSS 272. The first WSS 270 may provide an indication of wheel speed measured for its corresponding wheel 212 (e.g., the left rear wheel) to the first ECU 250, and the second WSS 272 may provide an indication of wheel speed measured for its corresponding wheel 212 (e.g., the right rear wheel) to the second ECU 252.

The first and second ECUs 250 and 252 take electronic instruction from the VCM 146 for initiating braking functions via the first and second EMBs 240 and 242, respectively, and there is no mechanical/hydraulic connection therefore between the brake pedal 120 and the rear brakes in this example (whereas such connection exists for the front brakes). Given that these instructions are transmitted electronically, redundant power supplies are employed to ensure that braking can be accomplished even if one of the power supplies happens to be lost for any reason. Accordingly, a first power network 280 is provided to power the first EMB 240, first ECU 250 and first motor 260. A second power network 282 is provided to power the second EMB 242, the second ECU 252 and the second motor 262. In this example, the first power network 280 also powers the VCM 146, and the second power network 282 also powers the EBB module 135. Thus, all electronic components needed for braking are powered from different power supplies and corresponding networks to ensure that power is available for braking. However, signaling to be sure that the powered components receive the signaling required to implement the braking desired or required may be another matter entirely. In an example embodiment, the first power network 280 may be a quality management (QM) power source, and the second power network 282 may be an ISIL B power source. However, other power sources may be employed in alternative embodiments.

The first ECU 250 and the second ECU 252 may each be operably coupled to the VCM 146 to receive control instructions therefrom via a first communication bus 290 (e.g., a public CAN). As discussed above, the VCM 146 is the primary control source for providing control signals to the first and second ECUs 250 and 252. However, if the VCM 146 is lost or inoperable for any reason (e.g., loss of the first power network 280, loss of communication to/from the VCM 146, etc.) backup signaling for the first and second ECUs 250 and 252 may be provided via a communication bus network that incorporates the EBB module 135 as a backup control signal source. To accomplish this, the communication bus network may incorporate a second communication bus 292 (e.g., a private CAN) that couples the first and second ECUs 250 and 252 to the EBB module 135. However, the second communication bus 292 could also be divided into two separate private CAN buses in some cases. By employing the first and second communication buses 290 and 292, for example, if the VCM 146 is inoperable for any reason, and primary signaling for control of brake functions at the first and second ECUs 250 and 252 are therefore interrupted or unavailable, backup signaling regarding braking functions may be provided to the first and second ECUs 250 and 252 from the EBB module 135 over the second communication bus 292.

Thus, for example, if a brake torque request is otherwise generated at the VCM 146 (based on position of the brake pedal 120) of 1000 Nm, instructions would normally be provided from the VCM 146 to the first and second ECUs 250 and 252 over the first communication bus 290 with the first EMB 240 being instructed to apply 500 Nm of braking torque and the second EMB 242 being instructed to apply 500 Nm of braking torque. Loss of the VCM 146 and/or the first communication bus 290 would then be responded to by the provision of a corresponding instruction from the EBB module 135 to each of the first and second ECUs 250 and 252 over the second communication bus 292 to apply respective braking torques to the first and second EMBs 240 and 242, which may also be approximately 500 Nm of braking torque each.

Example embodiments therefore provide a central vehicle control module or controller (e.g., the VCM 146) for primary braking control, with an EBB module as a secondary control option where each is powered from a different power source. The backup function of the second communication bus 292 may ensure that redundant signaling and redundant power supplies can be provided to the EMBs at the same time. However, other functional capabilities may also be provided in enhancement of conventional systems in some cases. For example, in an example embodiment, the first and second EMBs 240 and 242 may also be capable of providing wheel end anti-lock brake (ABS) functions responsive to a loss of either or both of the wheel speed sensors (e.g., the first and/or second WSSs 270 and 272). Final park brake application may also be accomplished in some cases due to loss of communication. In this regard, for example, if a loss of communication with both the VCM 146 and the EBB module 135 is experienced, the first and second ECUs 250 and 252 may be programmed to apply the park brake as soon as measured wheel speed (e.g., from the first and second WSSs 270 and 272) decreases (and perhaps also stabilizes) at zero speed.

Figure 3:
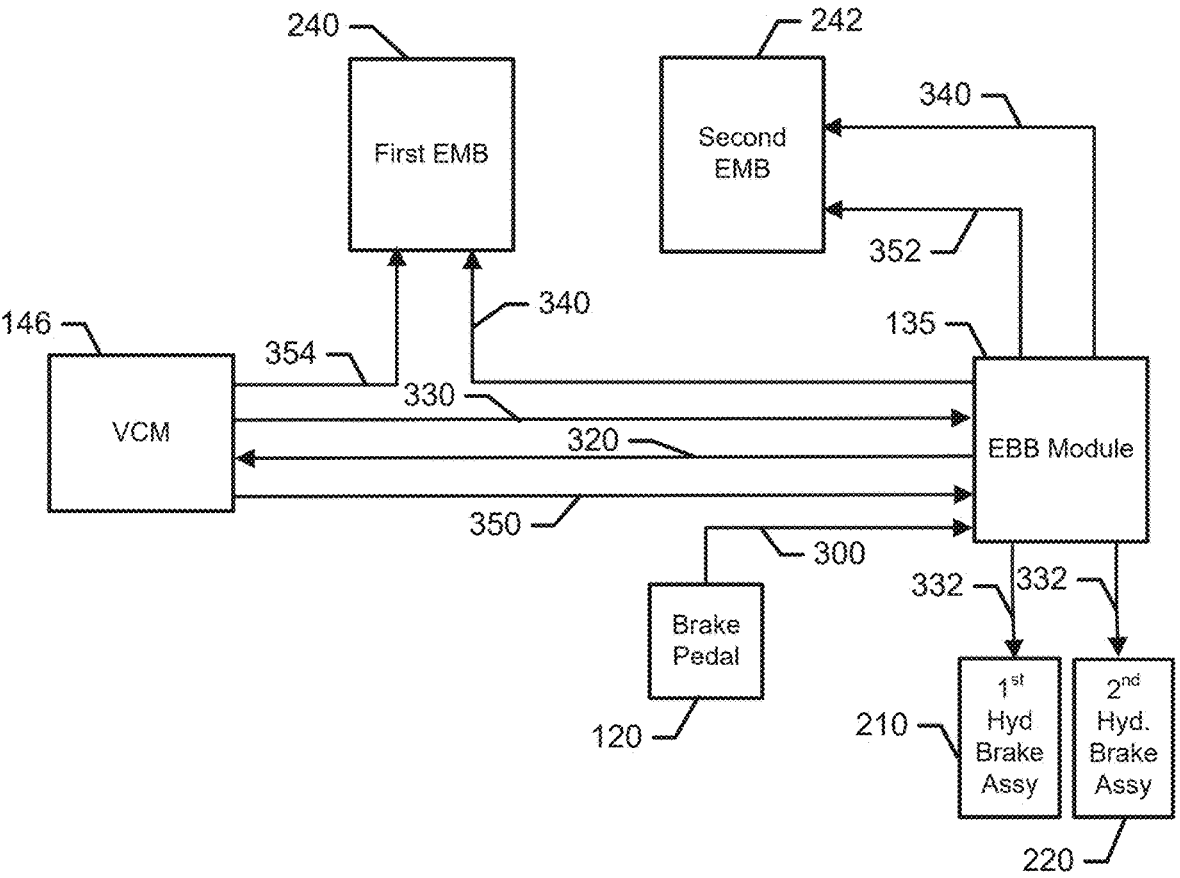
FIG. 3 illustrates a block diagram of signaling arbitrated by an EBB module associated with braking control in accordance with an example embodiment.

In some embodiments, the EBB module 135 may perform brake signal arbitration for the system. FIG. 3 illustrates a block diagram showing signaling associated with operation of the braking system of a vehicle where such arbitration is practiced in accordance with an example embodiment. In this regard, a pedal force 300 may be applied at the brake pedal 120 and communicated to the EBB module 135. The EBB module 135 may communicate a brake pedal travel estimate 310 to the VCM 146. The brake pedal travel estimate 320 may drive generation of a braking torque request from the VCM 146 to the first and second EMBs 240 and 242 via arbitration at the EBB module 135. In this regard, the VCM 146 may provide a front and rear axle braking torque request 330 to the EBB module 135. Corresponding hydraulic brake actuation 332 may then be provided from the EBB module 135 to the first and second hydraulic brake assemblies 210 and 220, and arbitrated braking torque requests 340 may also be communicated from the EBB module 135 to the first and second EMBs 240 and 242. The VCM 146 may also provide a parking brake command 350 to the EBB module 135 for providing a relay command 352 on to the second EMB 242, while providing a parking brake command 354 also directly to the first EMB 240.

Figure 4:
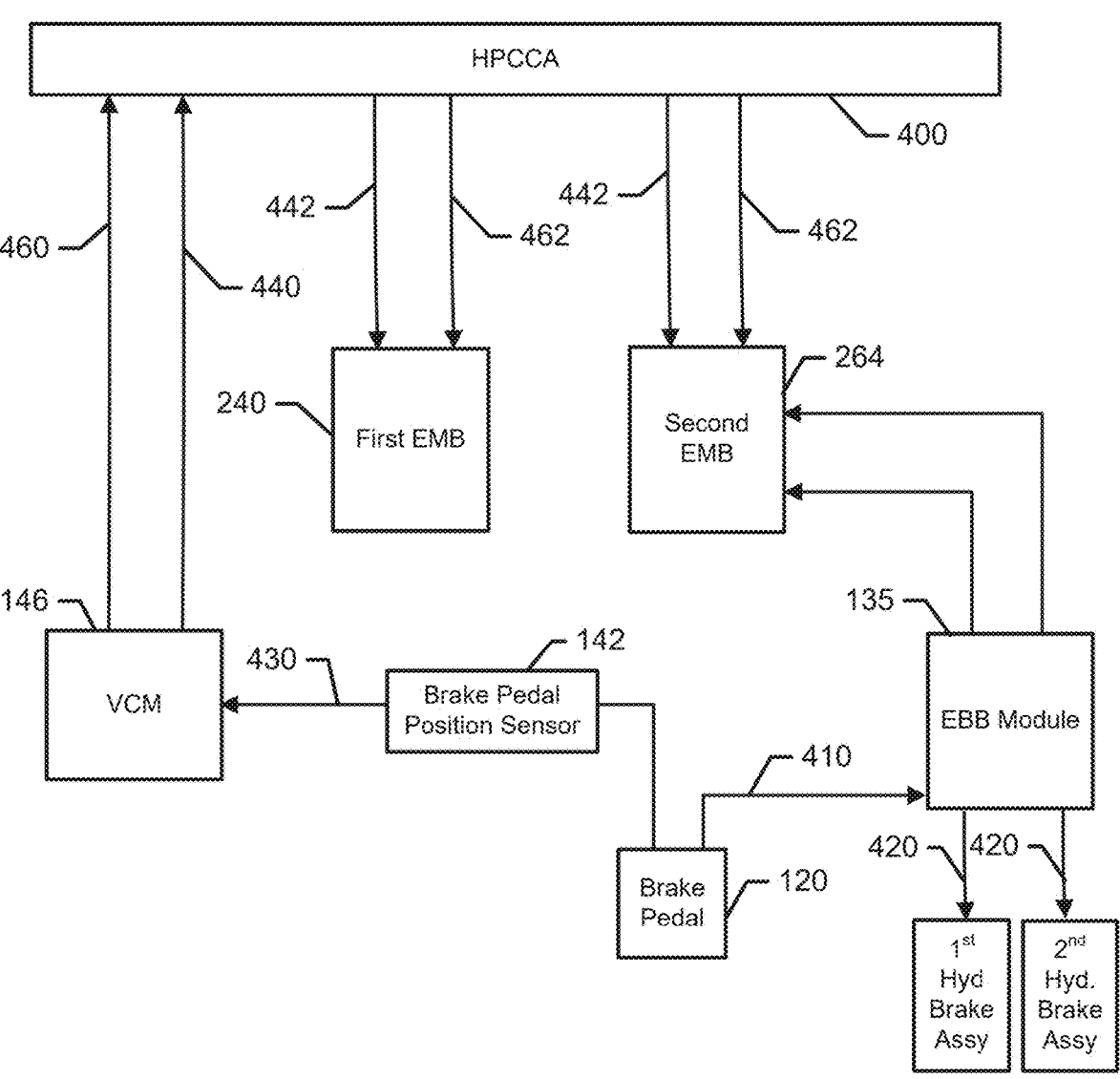
FIG. 4 illustrates a block diagram of a gateway managing signals between communication buses in accordance with an example embodiment.

Although not shown in FIG. 2, in some embodiments, a component may be provided as a gateway device to act as a gateway between individual busses (e.g., the first and second communication buses 290 and 292) of the communication bus network. Although not required, the gateway device may, in some cases, be embodied as a high power computer cluster A (HPCCA) 400 as shown in FIG. 4. In this regard, FIG. 4 shows the brake pedal 120 providing an input 410 to the EBB module 135 based on pedal force that in turn generates hydraulic brake actuation 420 from the EBB module 135 to the first and second hydraulic brake assemblies 210 and 220. Meanwhile, the movement of the brake pedal 120 also causes the brake pedal position sensor 142 to generate a pedal angle 430 for provision to the VCM 146. The VCM 146 may generate a brake torque request 440 for the rear axle that may then be split by the HPCCA 400 into separate individual brake torque requests 442 for the first and second EMBs 240 and 242. A park brake request 460 may also be split by the HPCCA 400 into respective individual parking brake requests 462 for the first and second EMBs 240 and 242.

A vehicle braking system for a vehicle may therefore be provided. The vehicle braking system may include a first hydraulic brake assembly associated with a first front wheel, a second hydraulic brake assembly associated with a second front wheel, a front EBB module operably coupled to the first and second hydraulic brake assemblies to control primary operation of the first and second hydraulic brake assemblies, a first EMB assembly associated with a first rear wheel, a second EMB assembly associated with a second rear wheel, a controller operably coupled to the first and second EMB assemblies to control primary operation of the first and second EMB assemblies, a first power network and a second power network providing redundant power supply to the system, and a communication bus network operably coupling both the EBB module and the controller to the first and second EMB assemblies to enable the EBB module to provide control of backup operation of the first and second EMB assemblies if the controller is inoperable.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the first power network is operably coupled to the controller and the first EMB assembly, and the second power network is operably coupled to the EBB module and the second EMB assembly. In an example embodiment, the communication bus network may include a first bus network operably coupling the first and second EMB assemblies to the EBB module, and a second bus network operably coupling the first and second EMB assemblies to the controller. In some cases, the first bus network may be a private controller area network (CAN) bus, and the second bus network may be a public CAN bus. In an example embodiment, the first power network may be a QM power source, and the second power network may be a ASIL B power source. In an example embodiment, the first EMB assembly may include a first electronic control unit (ECU) and the second EMB assembly comprises a second ECU, the first bus network may extend between the first and second ECUs and the EBB module, and the second bus network may extend between the first and second ECUs and the controller. In an example embodiment, the first and second ECU may be respectively operably coupled to a first wheel speed sensor and a second wheel speed sensor, where the first wheel speed sensor provides wheel speed to the first ECU for the first rear wheel, and the second wheel speed sensor provides wheel speed to the second ECU for the second rear wheel. In response to a loss of communication between the first and second ECUs and both the controller and the EBB module, the first and second ECU may apply a parking brake to the first and second rear wheels, respectively, when the first and second wheel speed sensors each indicate a zero wheel speed for the first and second rear wheels. In some cases, the first and second ECUs may provide a wheel end anti-lock brake system (ABS) function for the first and second rear wheels, respectively, in response to a loss of communication from the first and second wheel speed sensors. In an example embodiment, the first and second ECUs may each include a respective motor to provide brake torque to the first and second rear wheels, respectively, and signaling for operation of the respective motor of the first and second ECUs is primarily provided via the controller via the second bus network, and is provided in backup via the EBB module. In some cases, a brake pedal of the system may be operably coupled to the controller, and signaling for braking to the EBB module is received from the brake pedal through the controller.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle braking system comprising:
   a first hydraulic brake assembly associated with a first front wheel;
   a second hydraulic brake assembly associated with a second front wheel;
   a front electronic brake boost (EBB) module operably coupled to the first and second hydraulic brake assemblies to control primary operation of the first and second hydraulic brake assemblies;
   a first electromechanical brake (EMB) assembly associated with a first rear wheel;
   a second EMB assembly associated with a second rear wheel;
   a controller operably coupled to the first and second EMB assemblies to control primary operation of the first and second EMB assemblies;
   a first power network and a second power network providing redundant power supply to the vehicle braking system; and
   a communication bus network operably coupling both the front EBB module and the controller to the first and second EMB assemblies to enable the front EBB module to provide control of backup operation of the first and second EMB assemblies responsive to the controller being inoperable, wherein the communication bus network comprises a first bus network operably coupling the first and second EMB assemblies to the front EBB module, and a second bus network operably coupling the first and second EMB assemblies to the controller, wherein the first bus network is a private controller area network (CAN) bus, and the second bus network is a public CAN bus, and wherein the second bus network is separate and isolated from the first bus network.

2. The vehicle braking system of claim 1, wherein the first power network is operably coupled to the controller and the first EMB assembly, and the second power network is operably coupled to the front EBB module and the second EMB assembly.

3. The vehicle braking system of claim 1, wherein the first power network is QM power, and the second power network is ASIL B power.

4. The vehicle braking system of claim 1, wherein the first EMB assembly comprises a first electronic control unit (ECU) and the second EMB assembly comprises a second ECU, wherein the first bus network extends between the first and second ECUs and the front EBB module, and wherein the second bus network extends between the first and second ECUs and the controller.

5. The vehicle braking system of claim 4, wherein the first and second ECU are respectively operably coupled to a first wheel speed sensor and a second wheel speed sensor, the first wheel speed sensor providing wheel speed to the first ECU for the first rear wheel, and the second wheel speed sensor providing wheel speed to the second ECU for the second rear wheel, and wherein in response to a loss of communication between the first and second ECUs and both the controller and the front EBB module, the first and second ECU apply a parking brake to the first and second rear wheels, respectively, when the first and second wheel speed sensors each indicate a zero wheel speed for the first and second rear wheels.

6. The vehicle braking system of claim 5, wherein the first and second ECUs provide a wheel end anti-lock brake system (ABS) function for the first and second rear wheels, respectively, in response to a loss of communication from the first and second wheel speed sensors.

7. The vehicle braking system of claim 4, wherein the first and second ECUs each include a respective motor to provide brake torque to the first and second rear wheels, respectively, and wherein signaling for operation of the respective motor of the first and second ECUs is primarily provided via the controller via the second bus network, and is provided in backup via the front EBB module.

8. The vehicle braking system of claim 1, wherein a brake pedal of the system is operably coupled to the controller, and signaling for braking to the front EBB module is received from the brake pedal through the controller.

9. A vehicle braking system comprising:

a first hydraulic brake assembly associated with a first front wheel, a second hydraulic brake assembly associated with a second front wheel, a front electronic brake boost (EBB) module operably coupled to the first and second hydraulic brake assemblies to control primary operation of the first and second hydraulic brake assemblies, a first electromechanical brake (EMB) assembly associated with a first rear wheel, a second EMB assembly associated with a second rear wheel, a controller operably coupled to the first and second EMB assemblies to control primary operation of the first and second EMB assemblies, a first power network and a second power network providing redundant power supply to the vehicle braking system, a first bus network operably coupling the first and second EMB assemblies to the front EBB module, and a second bus network operably coupling the first and second EMB assemblies to the controller, wherein the first bus network and the second bus network operably couple both the front EBB module and the controller to the first and second EMB assemblies to enable the front EBB module to provide control of backup operation of the first and second EMB assemblies responsive to the controller being inoperable, wherein the first EMB assembly comprises a first electronic control unit (ECU) and the second EMB assembly comprises a second ECU, wherein the first bus network extends between the first and second ECUs and the front EBB module, wherein the second bus network extends between the first and second ECUs and the controller, wherein the first and second ECU are respectively operably coupled to a first wheel speed sensor and a second wheel speed sensor, the first wheel speed sensor providing wheel speed to the first ECU for the first rear wheel, and the second wheel speed sensor providing wheel speed to the second ECU for the second rear wheel, and wherein in response to a loss of communication between the first and second ECUs and both the controller and the front EBB module, the first and second ECU apply a parking brake to the first and second rear wheels, respectively, when the first and second wheel speed sensors each indicate a zero wheel speed for the first and second rear wheels.

10. The vehicle braking system of claim 9, wherein the first power network is operably coupled to the controller and the first EMB assembly, and the second power network is operably coupled to the front EBB module and the second EMB assembly.

11. The vehicle braking system of claim 10, wherein the first communication bus is a private controller area network (CAN) bus, and the second bus network is a public CAN bus.

12. The vehicle braking system of claim 11, wherein the first power network is QM power, and the second power network is ASIL B power.

13. The vehicle braking system of claim 9, wherein the first and second ECUs provide a wheel end anti-lock brake system (ABS) function for the first and second rear wheels, respectively, in response to a loss of communication from the first and second wheel speed sensors.

14. The vehicle braking system of claim 9, wherein the first and second ECUs each include a respective motor to provide brake torque to the first and second rear wheels, respectively, and wherein signaling for operation of the respective motor of the first and second ECUs is primarily provided via the controller via the second bus network, and is provided in backup via the front EBB module.

15. The vehicle braking system of claim 9, wherein a brake pedal of the vehicle braking system is operably coupled to the controller, and wherein signaling for braking to the front EBB module is received from the brake pedal through the controller.

16. A method for applying additional braking to the vehicle braking system comprising:

controlling primary operation of a first hydraulic brake assembly associated with a first front wheel and a second hydraulic brake assembly associated with a second front wheel via a front electronic brake boost (EBB) module operably coupled to the first hydraulic brake assembly and the second hydraulic brake assembly, controlling primary operation of a first electromechanical brake (EMB) assembly associated with a first rear wheel and second EMB assembly associated with a second rear wheel via a controller operably coupled to the first EMB assembly and the second EMB assembly, and providing redundant power supply to the vehicle braking system via a first power network and a second power network, providing via a first wheel speed sensor a first rear wheel speed to a first electronic control unit (ECU) for the first rear wheel, providing via a second wheel speed sensor a second rear wheel speed to a second ECU for the second rear wheel, controlling backup operation of the first and second EMB assemblies via the front EBB module responsive to the controller being inoperable by a communication bus network operably coupling both the front EBB module and the controller to the first and second EMB assemblies, applying, in response to a loss of communication between the first and second ECUs and both the controller and the front EBB module, a parking brake to the first and second rear wheels, respectively via the first and second ECUs responsive to the first wheel speed sensor and the second wheel speed sensor each indicating a zero wheel speed for the first rear wheel speed and second rear wheel speed, wherein the first and second ECUs are respectively operably coupled to the first wheel speed sensor and the second wheel speed sensor, wherein a first bus network of the communication bus network operably couples the first and second EMB assemblies to the front EBB module and extends between the first and second ECUs and the front EBB module, wherein a second bus network of the communication bus network operably couples the first and second EMB assemblies to the controller and extends between the first and second ECUs and the controller, and wherein the first EMB assembly includes the first ECU and the second EMB assembly includes the second ECU.

\* \* \* \* \*